Jan 6, 1931.  C. J. ZUBE  1,787,503
RECEPTACLE MOLD
Filed June 10, 1927  2 Sheets-Sheet 2

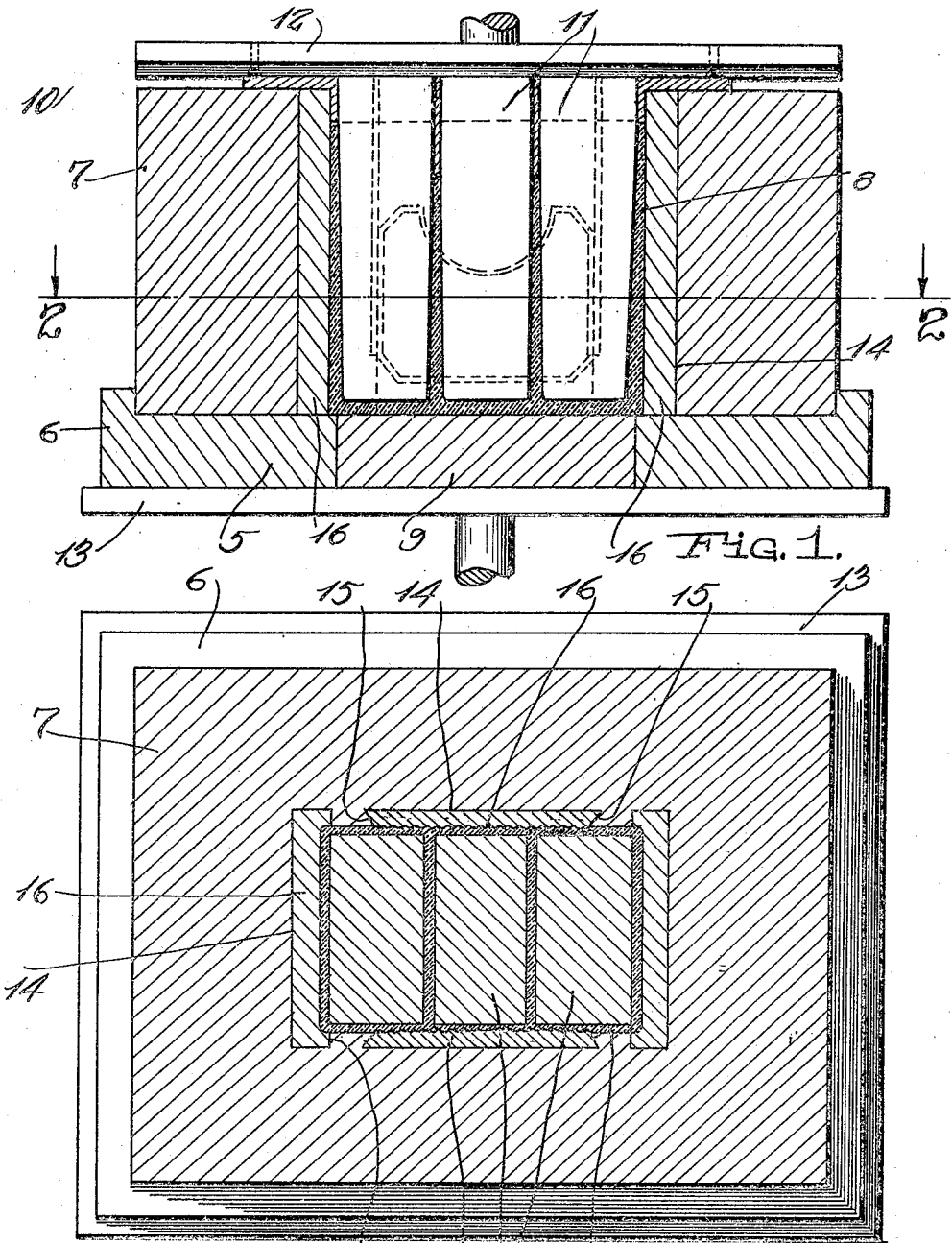

INVENTOR.
Carl J. Zube.
BY
ATTORNEY.

Patented Jan. 6, 1931

1,787,503

UNITED STATES PATENT OFFICE

CARL J. ZUBE, OF DETROIT, MICHIGAN, ASSIGNOR, BY MESNE ASSIGNMENTS, TO THE EVANS AUTO LOADING COMPANY, INC., OF DETROIT, MICHIGAN, A CORPORATION OF DELAWARE

RECEPTACLE MOLD

Application filed June 10, 1927. Serial No. 197,810.

This invention relates to receptacle molds, and has more particular reference to molds of that type commonly employed for forming cell containers of electrical storage batteries out of plastic materials, such as rubber composition and the like.

The primary object of the invention is to provide simple and efficient means for impressing the desired exterior surface design upon the receptacle or container during the molding thereof, such means permitting ready change of the surface design as found necessary or desirable.

A more specific object is to provide simple and efficient means for equipping the mold body with removable matrix plates by means of which the desired exterior surface design is imparted to the walls of the container during the molding operation.

A still further object is to so equip the mold body with the design impressing matrix plates that the latter may be readily removed from the mold body with the molded receptacle or container, to be subsequently readily stripped from the latter, without requiring formation of the mold body of separable sections.

Still another object is to enable the provision of the mold body with removable matrix plates so that the latter are effectively supported in position for use, the construction being extremely simple, and cheaply and easily manufactured.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a view partly in side elevation and partly in central longitudinal section of a receptacle mold equipped with removable matrix plates in accordance with the present invention, and operatively associated with the platens of a press;

Figure 2 is a horizontal section taken substantially upon line 2—2 of Figure 1;

Figure 3:
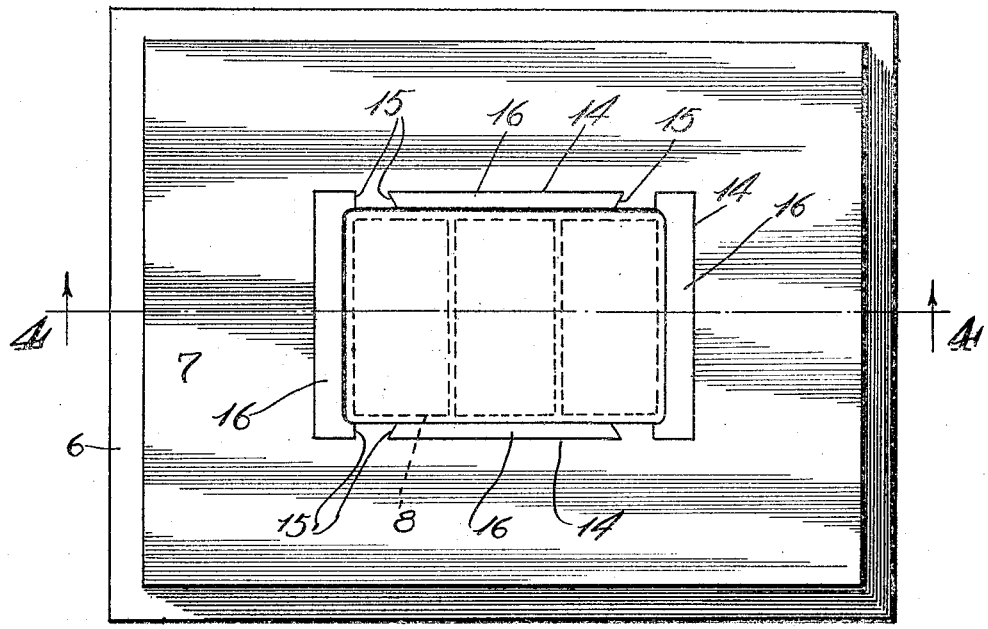
Figure 3 is a top plan view of the mold shown in Figure 1, with the top plate and cores removed.
Figure 4:
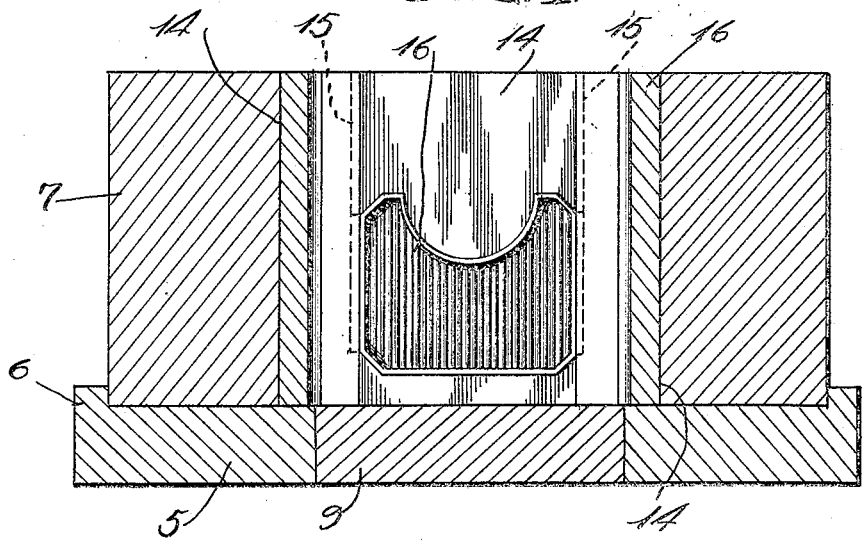
Figure 4 is a longitudinal section taken substantially upon line 4—4 of Figure 3.

The mold illustrated in the accompanying drawings includes a base plate 5 having an upstanding marginal flange 6 within which the lower part of the mold body 7 is seated as is well known in the art. The mold body 7 is formed of a one-piece metal casting having a central opening of proper size and shape to form the mold cavity within which the container or receptacle 8 is molded, and the base plate 5 is formed with a separate central part or section 9 concentric with but slightly smaller than the mold cavity or opening so that the same may be pushed upwardly for facilitating removal of the receptacle 8 from the mold body after being molded or sufficiently cured.

It is the usual practice to provide molds of this type with a cover element 9a and a plate 10 having rigid depending cores 11 adapted to be entered into the element 9a and the mold cavity for pressing the plastic material into the desired shape, the mold being placed between the upper and lower platens 12 and 13 of a hydraulic or other press. By attaching the cover or top plate 10 to the upper plate 12 of the press, the cores 11 may be readily lowered and entered into the mold cavity of the mold body 7, and during the pressing operation, the vulcanization can be effected by the suitable application of heat as is also well known in the art.

In accordance with the present invention, the mold body 7 is formed with one or more internal relatively wide vertical grooves or recesses 14 which are of uniform depth and open through the top of the mold body, and are also undercut at the sides as indicated at 15. Removably and slidably fitted in these recesses 14 are suitable matrix plates 16 which give or impart the desired exterior surface form to the molded container and which may be readily let down into place or elevated and removed, and which will be effectively maintained in proper operative position when in use, without the employment of any separate or extraneous fastening means or devices.

As shown, four matrix plates are preferably employed in molds for battery cell containers, two of the matrix plates being arranged at and extending entirely across the ends of the mold cavity as well as being shaped to form the rounded corners for the container. The remaining two matrix plates are arranged at the sides of the mold cavity and provided with suitable irregular impression surfaces for forming the desired exterior surface design upon the sides of the molded container.

When the receptacle has been sufficiently cured, the platens of the press are separated to remove the cores 11 from the mold body. By then pressing upwardly upon the base plate section 7, the molded receptacle may be readily removed from the mold cavity along with the design impressing matrix plates, adhered thereto. This removal of the matrix plates along with the molded container is permitted by reason of the fact that the recesses 14 open through the top of the mold body, and it will be apparent that upon removal of the container from the mold body such design impressing matrix plates may be readily stripped from the molded container. In this way the necessity of constructing the mold body of separable sections is avoided, and a number of different design impression matrix plates may be interchangeably employed with the mold body as will be apparent.

The recesses for the side matrix plates are preferably undercut by making the same of dove-tail form as shown in Figure 2. In view of the above it will be seen that the present invention provides means whereby the surface design of any molded product having a flat or round surface may be readily changed at a nominal cost.

Minor changes may be made without departing from the spirit and scope of the invention as claimed.

What I claim as new is:—

1. In a mold of the character described, a base plate, a one piece mold body having a mold cavity with vertical open top grooves formed in its walls at the sides and ends thereof, the side grooves being of less length than the end grooves and spaced therefrom for the reception of matrix plates, and separate matrix plates fitting said grooves and removable therefrom through their open tops.

2. A mold as claimed in claim 1, the base plate of which has a vertically movable central section forming the bottom of the mold cavity, and of less area than the latter, whereby said section may be raised to facilitate removal of the molded articles.

In testimony whereof I affix my signature.

CARL J. ZUBE.